United States Patent [19]

Shpiro

[11] Patent Number: 5,766,015
[45] Date of Patent: Jun. 16, 1998

[54] APPARATUS FOR INTERACTIVE LANGUAGE TRAINING

[75] Inventor: Zeev Shpiro, Tel Aviv, Israel

[73] Assignee: Digispeech (Israel) Ltd., Tel Aviv, Israel

[21] Appl. No.: 678,229

[22] Filed: Jul. 11, 1996

[51] Int. Cl.$^6$ ............................ G09B 19/00; G09B 19/04
[52] U.S. Cl. ............................................. 434/156; 434/185
[58] Field of Search ................................. 434/156, 157, 434/169, 167, 185

[56] References Cited

U.S. PATENT DOCUMENTS

| | | |
|---|---|---|
| 5,393,236 | 2/1995 | Blackmer et al. |
| 5,487,671 | 1/1996 | Shpiro et al. |
| 5,503,560 | 4/1996 | Stentiford . |

*Primary Examiner*—Richard J. Apley
*Assistant Examiner*—John Edmund Rovnak
*Attorney, Agent, or Firm*—Browdy and Neimark

[57] ABSTRACT

Apparatus for interactive language training including a trigger generator for eliciting expected audio responses by a user;

an expected audio response reference library containing a multiplicity of reference expected responses, the multiplicity of reference expected responses including a first plurality of reference expected responses having acceptable pronunciation and for each of the first plurality of reference expected responses having acceptable pronunciation, a second plurality of reference expected responses each having different pronunciation errors;

an audio response scorer which indicates the relationship between the expected audio response provided by the user and the reference expected responses; and a user feedback interface which indicates to the user the pronunciation errors in the expected audio responses provided by the user.

21 Claims, 10 Drawing Sheets

APPARATUS FOR INTERACTIVE LANGUAGE TRAINING

FIELD OF THE INVENTION

The present invention relates to educational systems generally and more particularly to computerized systems for teaching language.

BACKGROUND OF THE INVENTION

Computerized systems for teaching language are known. There is described in U.S. Pat. No. 5,487,671, one inventor of which is the inventor of the present invention, a computerized system for teaching language which inter alia provides an indication of the relationship between a user's language to a reference.

A product having substantially the same feature is commercially available from The Learning Company under the trade name "LEARN TO SPEAK ENGLISH".

Other commercially available products in this field are available from HyperGlot, Berlitz, Syracuse Language Systems Mindscape Global Language and Rosetta Stone Language Library.

SUMMARY OF THE INVENTION

The present invention seeks to provide a further improved computerized system for teaching language which provides an indication to the user of the type of pronunciation error or errors that the user is making.

There is thus provided in accordance with a preferred embodiment of the present invention apparatus for interactive language training comprising:

a trigger generator for eliciting expected audio responses by a user;

an expected audio response reference library containing a multiplicity of reference expected responses, the multiplicity of reference expected responses including a first plurality of reference expected responses having acceptable pronunciation and for each of the first plurality of reference expected responses having acceptable pronunciation, a second plurality of reference expected responses each having different pronunciation errors;

an audio response scorer which indicates the relationship between the expected audio response provided by the user and the reference expected responses; and a user feedback interface which indicates to the user the pronunciation errors in the expected audio responses provided by the user.

Preferably, the user feedback interface also provides instruction to the user how to overcome the pronunciation errors.

In accordance with a preferred embodiment of the present invention, the user feedback interface indicates to the user each pronunciation error immediately following each expected audio response.

Preferably, the feedback interface provides audio and visual indications of the pronunciation errors.

In accordance with a preferred embodiment of the present invention, the audio specimen generator is operative such that the expected audio response is a repetition of the audio specimen.

Alternatively, the audio specimen generator is operative such that the expected audio response is other than a repetition of the audio specimen.

As a further alternative, the audio specimen generator is operative such that the expected audio response is an audio specimen which may be chosen from among more than one possible expected audio responses.

Preferably, the trigger generator comprises an audio specimen generator for playing audio specimens to a user.

Alternatively or additionally, the trigger generator comprises an visual trigger generator for providing a visual trigger output to a user.

Preferably, the expected audio response library comprises an expected audio response reference database.

In accordance with a preferred embodiment of the present invention, the expected audio response reference database comprises a multiplicity of templates and is speaker independent.

There is also provided in accordance with a preferred embodiment of the present invention a method for interactive language training comprising:

eliciting expected audio responses by a user;

providing an expected audio response reference library containing a multiplicity of reference expected responses, the multiplicity of reference expected responses including a first plurality of reference expected responses having acceptable pronunciation and for each of the first plurality of reference expected responses having acceptable pronunciation, a second plurality of reference expected responses each having different pronunciation errors;

indicating the relationship between the expected audio response provided by the user and the reference expected responses; and indicating to the user the pronunciation errors in the expected audio responses provided by the user.

BRIEF DESCRIPTION OF THE DRAWINGS

The present invention will be more fully understood and appreciated from the following detailed description, taken in conjunction with the drawings in which.

DETAILED DESCRIPTION OF PREFERRED EMBODIMENTS

Figure 1:
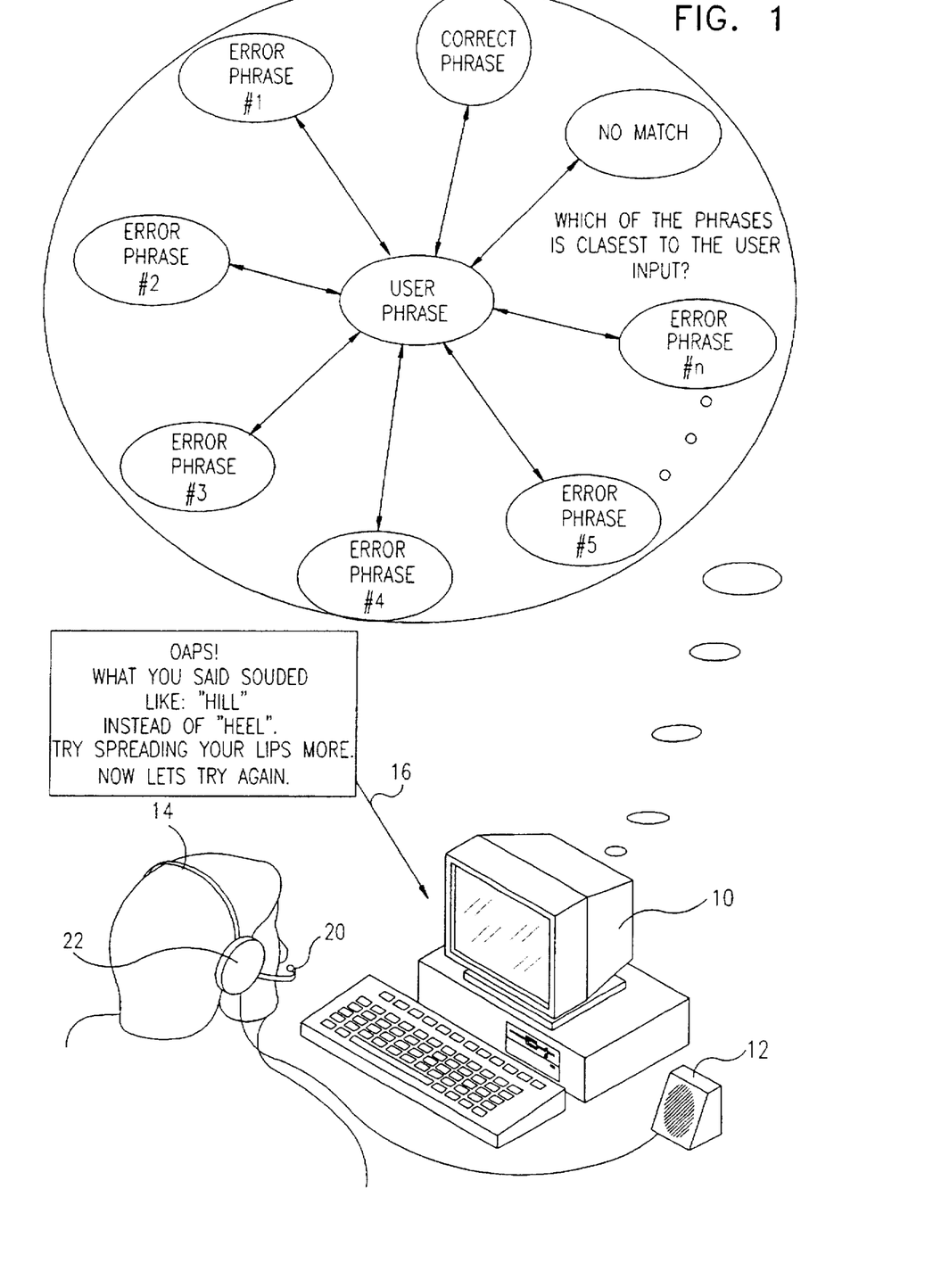
FIG. 1 is a generalized pictorial illustration of an interactive language teaching system constructed and operative in accordance with a preferred embodiment of the present invention.
Figure 2:
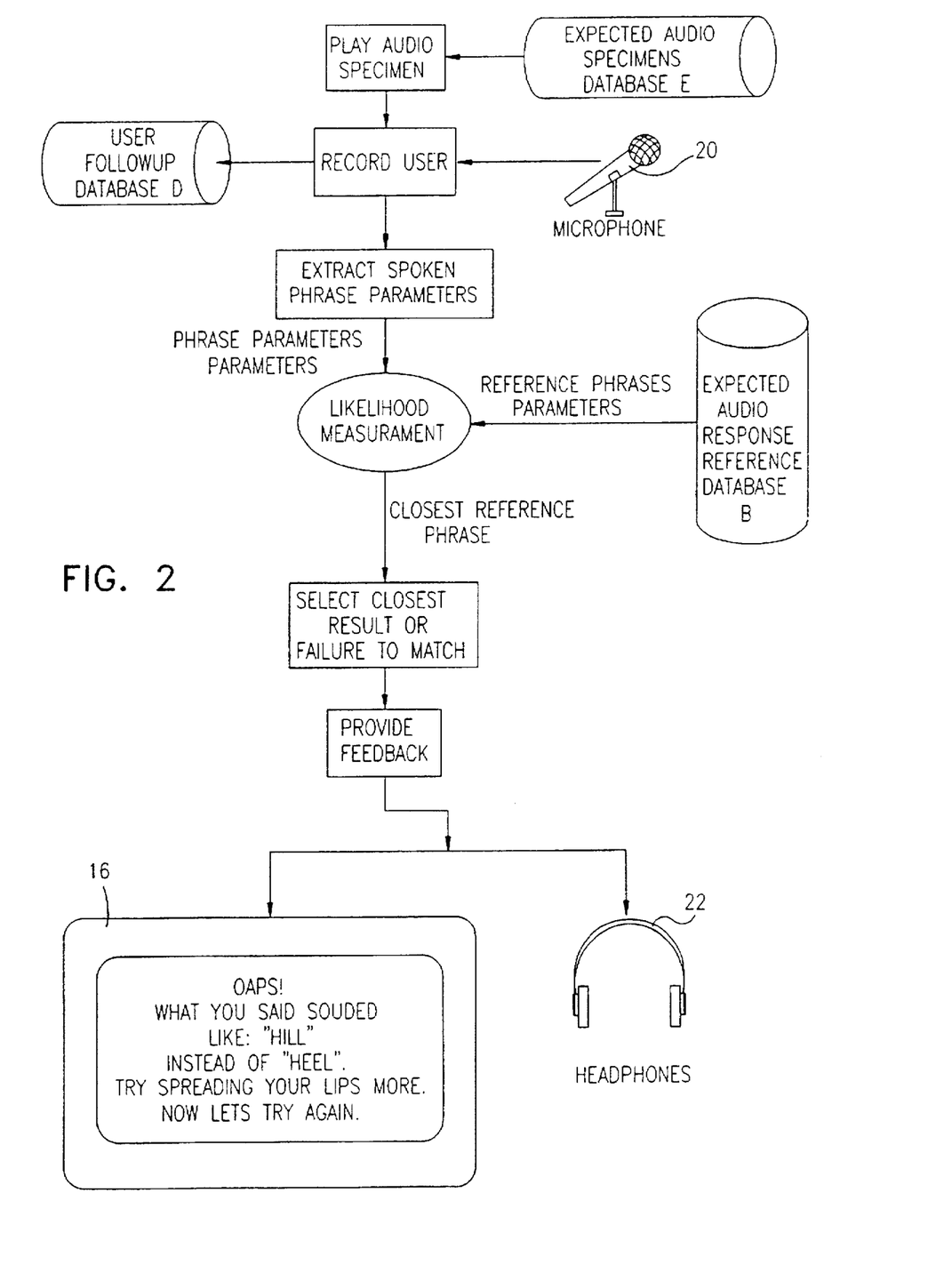
FIG. 2 is a generalized functional block diagram of the operation of the system of FIG. 1 during language teaching.

Reference is now made to FIG. 1, which is a generalized pictorial illustration of an interactive language teaching system constructed and operative in accordance with a preferred embodiment of the present invention and to FIG. 2, which is a generalized functional block diagram of the operation of the system of FIG. 1 during language teaching.

It is to be appreciated that the system of FIG. 1 has many similarities to the Computerized System for Teaching Speech described in U.S. Pat. No. 5,487,671, the disclosure of which is hereby incorporated by reference.

As will be described in detail hereinbelow, the system of the present invention differs from that of U.S. Pat. No. 5,487,671 in that it operates with reference expected responses each having different pronunciation errors and includes an audio response scorer which indicates the relationship between the expected audio response provided by the user and the reference expected responses having pronunciation errors.

The system of FIGS. 1 and 2 is preferably based on a conventional personal computer 10, such as an IBM PC or compatible, using an Intel 80486 CPU running at 33 MHZ or higher, with at lest 8 MB of memory and running a DOS rev. 6.0 or above operating system. The personal computer 10 is preferably equipped with an auxiliary audio module 12. For example, a suitable audio module 12 is the Digispeech Plus audio adapter (DS311) manufactured by Digispeech, Inc. and distributed in the USA by DSP SOLUTIONS Inc., Mountain View, Calif. A headset 14 is preferably associated with audio module 12.

Generally, the personal computer 10 and audio module 12 are supplied with suitable software so as to provide the following functionalities:

- a trigger generator for eliciting expected audio responses by the user. The trigger generator preferably comprises an audio specimen generator for playing audio specimens to a user but may additionally or alternatively comprise a visual trigger generator for providing a visual trigger output to a user;
- an expected audio response reference library containing a multiplicity of reference expected responses, the multiplicity of reference expected responses including a first plurality of reference expected responses having acceptable pronunciation and for each of the first plurality of reference expected responses having acceptable pronunciation, a second plurality of reference expected responses each having different pronunciation errors;
- an audio response scorer which indicates the relationship between the expected audio response provided by the user and the reference expected responses; and
- a user feedback interface which indicates to the user the pronunciation errors, if any, in the expected audio responses provided by the user.

The user feedback interface preferably provides audio feedback via the audio module 12 and headset 14. Additionally, as seen in FIGS. 1 and 2, a display 16 is preferably provided to indicate pronunciation errors to the user in a visible manner, as illustrated, for example in FIG. 1.

In accordance with a preferred embodiment of the present invention, a total of six different databases are employed. For convenience and ease of understanding of the invention, the six databases are briefly described hereinbelow in the order in which they are created and used in the invention:

A. Interim Audio Specimens Database—This database is generated by recording a plurality of native speakers including a distribution of various geographical origins, various ages and both genders. Each speaker pronounces a plurality of predetermined phrases. For each of the plurality of predetermined phrases, each speaker pronounces the phrase correctly and also repeats the phrase incorrectly a few times, each time with a different one of a plurality of predetermined pronunciation errors. Preferably, this database includes plural recordings of each of the above pronounced phrases for each speaker, so as to provide an enhanced statistical base.

B. Expected Audio Response Reference Database—This is a database containing templates rather than recorded speech. It is derived from the Interim Audio Specimens Database A, by extracting the speech parameters of each of the pronounced phrases and combining them statistically so as to represent the pronunciation of the plurality of native speakers referred to hereinabove. Thus each template represents a statistical combination of the pronunciations of a group of native speakers.

A single template may be produced to cover all of the native speakers whose pronunciation is recorded in the Interim Audio Specimens Database A, or plural templates may be used, when a single template does not accurately represent the entire range of native speakers. For example, one template may represent males and the other females. In accordance with a preferred embodiment of the invention, the Expected Audio Response Reference Database constitutes the expected audio response reference library, referred to above. This is a speaker independent database.

C. Phonetic Database—This is a commercially available database of speech parameters of all phonemes for a given language. Such databases are available, for example, from AT & T. Speech Systems Incorporated of Boulder, Colo., U.S.A. and Lernout & Hauspie Speech Products N.V. of Leper, Belgium.

D. User Followup Database—This is a collection of recorded user responses.

E. Expected Audio Specimens Database—This is a collection of recordings of a single trained speaker pronouncing each of the plurality of phrases correctly.

F. Reference Audio Specimens Database—This is a collection of recordings of a single trained speaker pronouncing each of the plurality of phrases incorrectly a few times, each with a different one of a plurality of predetermined pronunciation errors.

Reference is now made to FIG. 2, which is a generalized functional block diagram of the operation of the system of FIG. 1 during language teaching.

Audio specimens stored in Expected Audio Specimen Database E are played to the user via the audio module 14 (FIG. 1) in order to elicit expected audio responses by the user. A microphone 20, normally part of headset 14, is employed to record the user's audio responses, which are stored in User Followup Database C. The audio specimens typically include spoken phrases. The phrases may include one or more words. Alternatively or additionally there may be provided a visual trigger generator for providing a visual trigger output to a user for eliciting expected audio responses by the user.

Spoken phrase parameters are extracted from the user's audio responses and are compared with reference phrase parameters to measure the likelihood of a match between the spoken phrase parameters of the user's audio response and the reference phrase parameters of a corresponding correct or incorrect phrase stored in the Expected Audio Response Reference Database B.

The result of the likelihood measurement is selection of a phrase which is closest to the user's audio response or an indication of failure to make any match. An audio and preferably also visible feedback indication is provided to the user, identifying the matched phrase and indicating whether it is correct or incorrect. Preferably the user response may include a word, several words, a sentence or a number of sentences out of which one only or several phrases are matched during the teaching process. Additional teaching information as how to overcome indicated errors is preferably also provided in an audio-visual manner. Headphones 22, preferably forming part of headset 14 (FIG. 1) and display 16 are preferably employed for this purpose.

Figure 3:
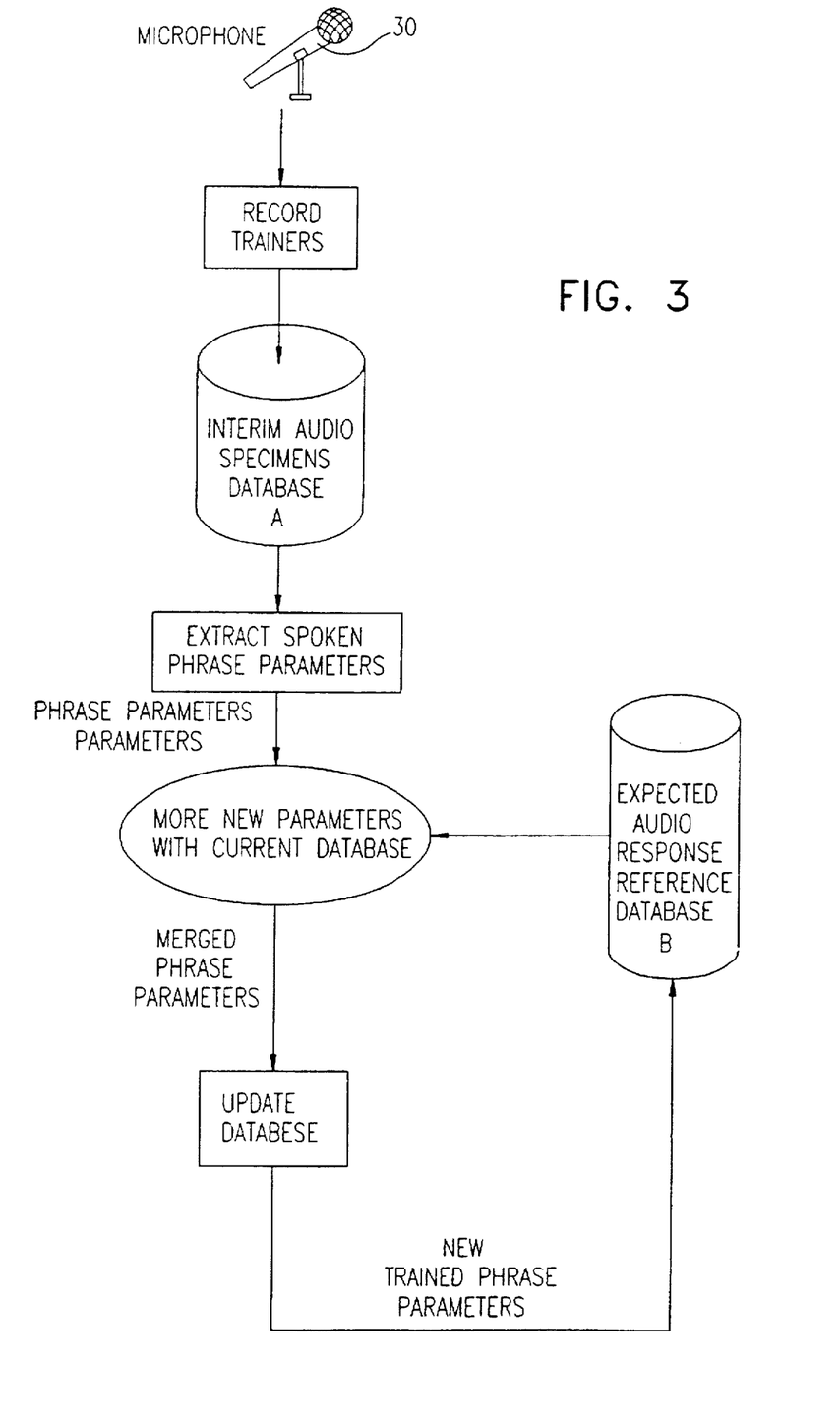
FIG. 3 is a generalized functional block diagram of the operation of the system of FIG. 1 during audio reference library generation in accordance with one embodiment of the present invention.

Reference is now made to FIG. 3, which is a generalized functional block diagram of the operation of the system of FIG. 1 during generation of the Expected Audio Response Reference Database B in accordance with one embodiment of the present invention. Here, a microphone 30, is used to record phrases spoken by a plurality of native speakers, including a distribution of various geographical origins, various ages and both genders. Each speaker pronounces a plurality of predetermined phrases. For each of the plurality of predetermined phrases, each speaker pronounces the phrase correctly and also repeats the phrase incorrectly a few times, each time with a different one of a plurality of predetermined pronunciation errors. The recordings are retained in the Interim Audio specimens Database A. Preferably, this database includes plural recordings of each of the above pronounced phrases for each speaker, so as to provide an enhanced statistical base.

Spoken phrase parameters are extracted and merged with phrase parameters already stored in the Expected Audio Response Reference Database to build up the Expected Audio Response Reference Database B. This database contains a multiplicity of reference expected responses, the multiplicity of reference expected responses including a first plurality of reference expected responses having acceptable pronunciation and for each of the first plurality of reference expected responses having acceptable pronunciation, a second plurality of reference expected responses each having different pronunciation errors.

It may be appreciated that each phrase is recorded correctly N times by each of a plurality of M speakers. It is additionally recorded N times by each of M speakers in L different forms each containing a different pronunciation error.

Figure 4:
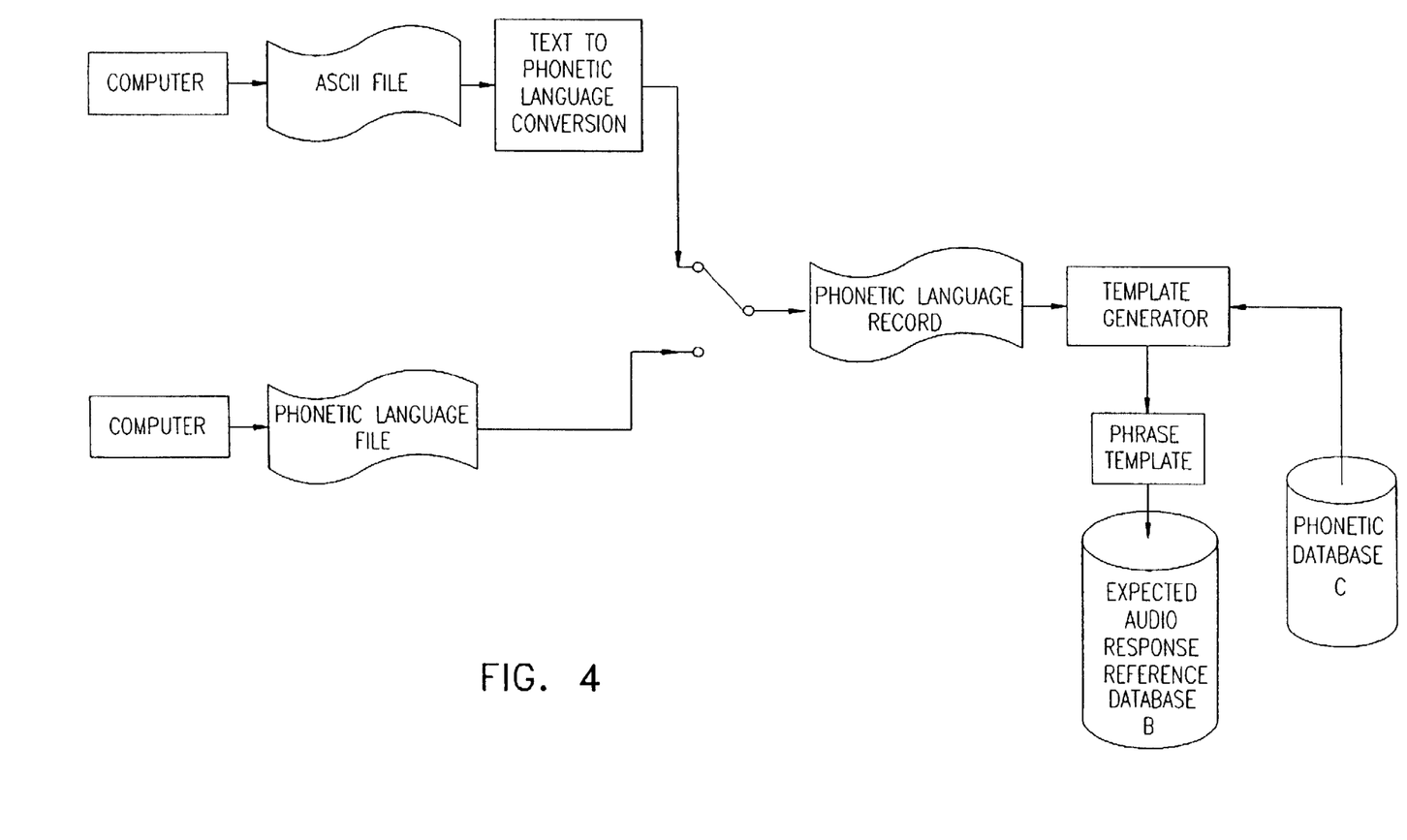
FIG. 4 is a generalized functional block diagram of the operation of the system of FIG. 1 during audio reference library generation in accordance with another embodiment of the present invention.

Reference is now made to FIG. 4, which is a generalized functional block diagram of the operation of the system of FIG. 1 during audio reference library generation in accordance with another embodiment of the present invention. Here, the Expected Audio Response Reference Database B is computer generated by generating text and phonetic language files which are employed to produce phonetic language records. The phonetic language record is employed together with existing Phonetic Database C to generate phrase templates which together constitute the Expected Audio Response Reference Database B.

Figure 5A:
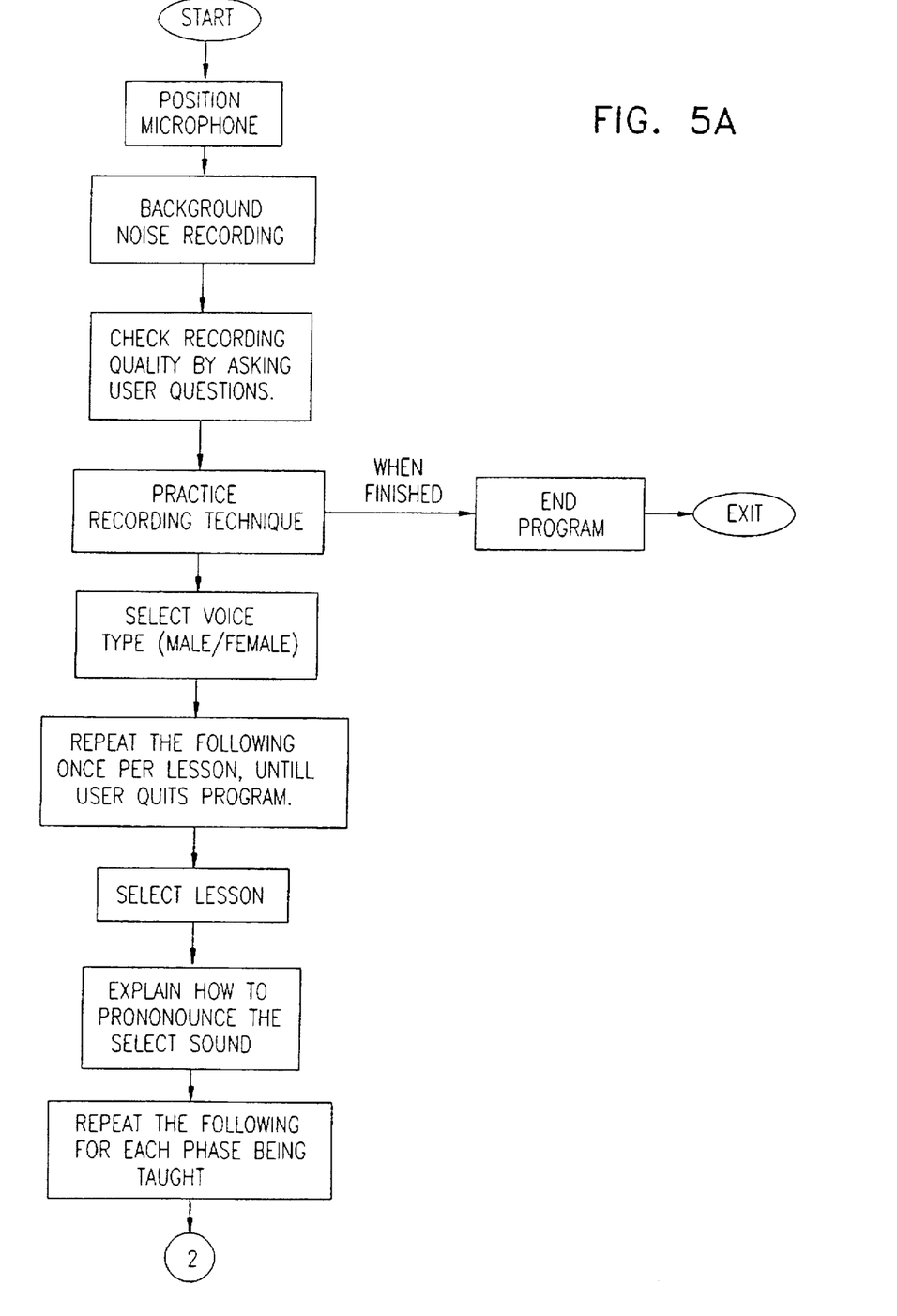
FIGS. 5A and 5B together constitute a generalized flow chart illustrating operation of the system during language teaching in accordance with the generalized functional block diagram of FIG. 2.
Figure 5B:
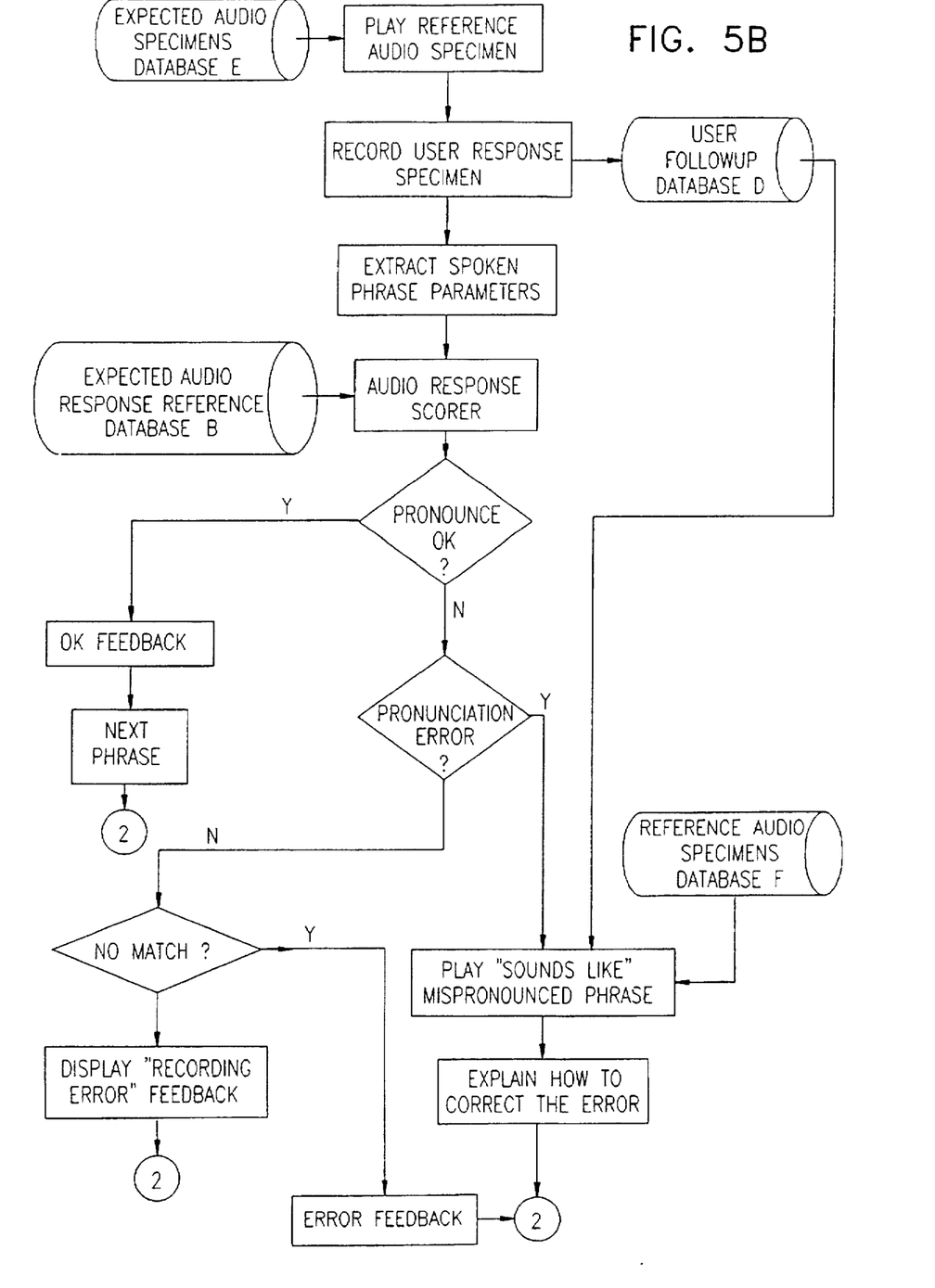

Reference is now made to FIGS. 5A and 5B, which together constitute a generalized flow chart illustrating operation of the system during language teaching in accordance with the generalized functional block diagram of FIG. 2. Once the indicated initial preparations indicated in the flowchart are complete and the voice type is selected, a lesson is selected and the user is provided with an explanation of how to pronounce a selected sound. For each selected sound, a reference audio specimen taken from Reference Audio Specimens Database F is played for the user in order to elicit an expected audio response by the user.

The user's response is recorded and compared with reference expected responses contained in the Expected Audio Response Reference Database B, by the Student Response Specimen Recorder as described in the U.S. Pat. No. 5,487, 671, the disclosure of which is hereby incorporated by reference.

If the best match is to the correct response, positive feedback is provided to the user and the lesson progresses to the next audio specimen.

If the best match is to a reference expected response having a pronunciation error then appropriate feedback is provided to the user. This feedback preferably includes an explanation of the error and how to correct it as well as a playback of the reference expected response. In accordance with a preferred embodiment of the present invention, the mispronounced phrase is played to the user from the Reference Audio Specimens Database.

A User Followup Database D may be employed to play back the latest or earlier user responses for indicating user progress or other purposes.

Figure 6A:
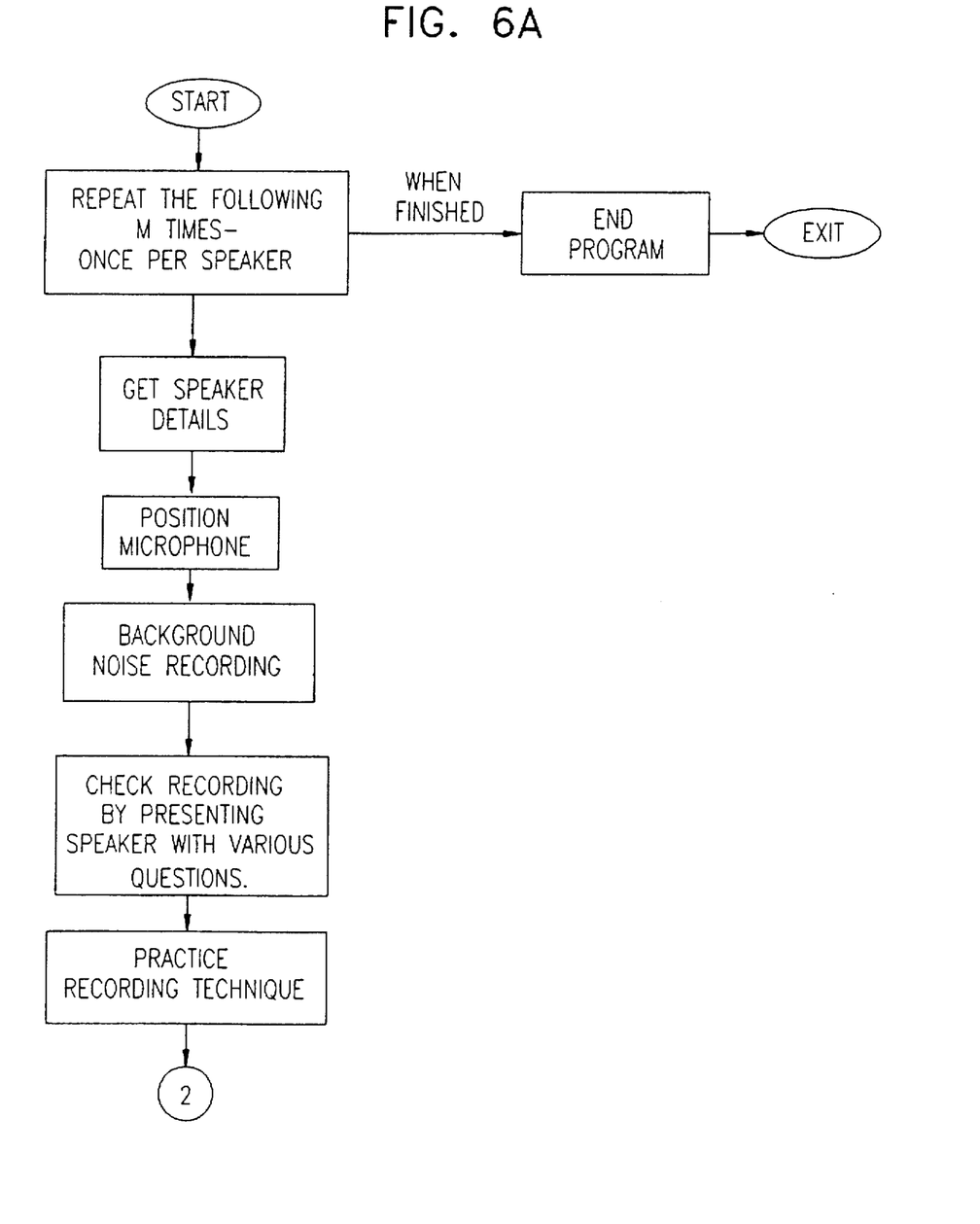
FIGS. 6A, 6B and 6C together constitute a generalized flow chart illustrating operation of the system during audio reference library generation for language teaching in accordance with the generalized functional block diagram of FIG. 3.
Figure 6B:
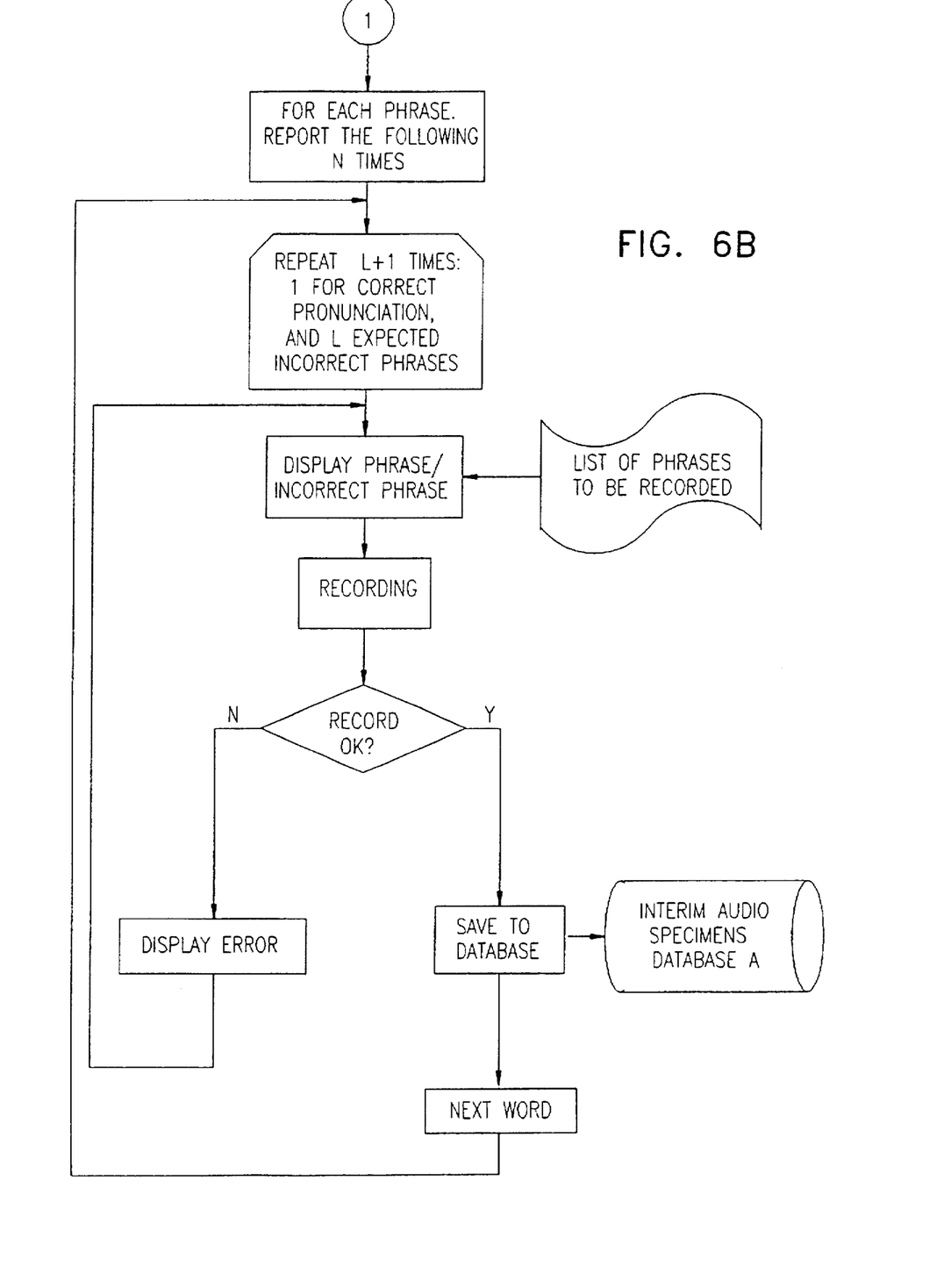
Figure 6C:
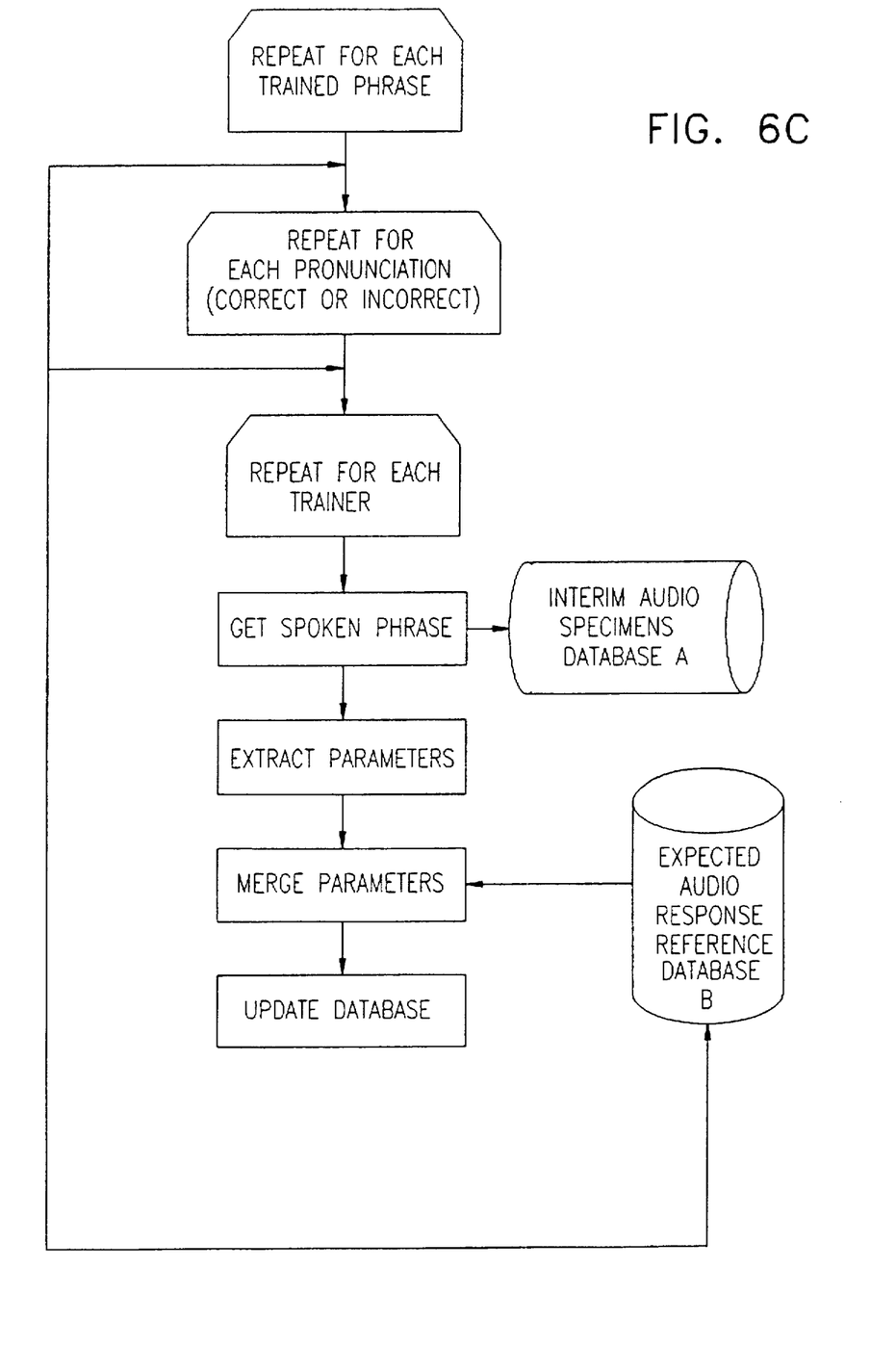

Reference is now made to FIGS. 6A, 6B and 6C, which together constitute a generalized flow chart illustrating operation of the system during audio reference library generation for language teaching in accordance with the generalized functional block diagram of FIG. 3.

Once the initial preparations indicated in the flowchart are complete the trained speaker speaks the correct phrase and a plurality of incorrect phrases, whose pronunciation is similar to the correct phrase but for one or more errors in pronunciation to provide reference expected responses each having different pronunciation errors. Each such set of correct and incorrect phrases is recorded. In accordance with a preferred embodiment of the invention, the Interim Audio Specimens Database A contains the various recordings. Database A is employed, as described above with reference to FIG. 3 to produce the Expected Audio Response Reference Database B, FIG. 6C.

Figure 7:
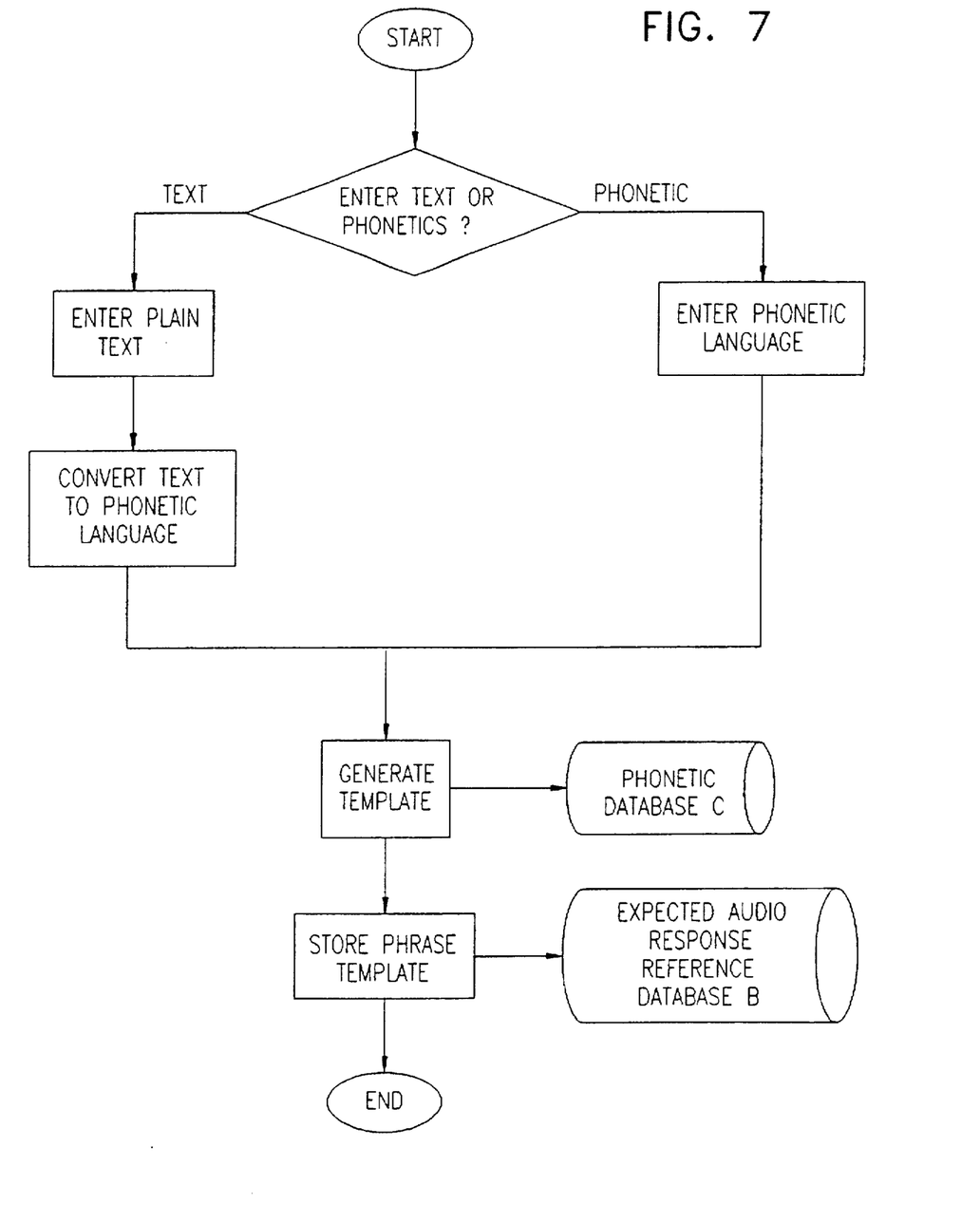
FIG. 7 is a generalized flow chart illustrating operation of the system during audio reference library generation for language teaching in accordance with the generalized functional block diagram of FIG. 4.

Reference is now made to FIG. 7, which is a generalized flow chart illustrating operation of the system during audio reference library generation for language teaching in accordance with the generalized functional block diagram of FIG. 4. Here a computer is employed to enter plain text and a phonetic language and to convert the text to the indicated phonetic language. Using a Phonetics Database C of the type described above, a template is generated. The template is then stored in the Expected Audio Response reference Database B.

It will be appreciated by persons skilled in the art that the present invention is not limited by what has been particularly shown and described hereinabove. Rather the scope of the present invention is defined only by the claims which follow:

I claim:

1. Apparatus for interactive language training comprising:
  a trigger generator for eliciting expected audio responses by a user;
  an expected audio response reference library containing a multiplicity of reference expected responses, the multiplicity of reference expected responses including a first plurality of reference expected responses having acceptable pronunciation and for each of said first plurality of reference expected responses having acceptable pronunciation, a second plurality of reference expected responses each having different pronunciation errors;
  an audio response scorer which indicates the relationship between the expected audio response provided by the user and the reference expected responses; and a user feedback interface which indicates to the user the pronunciation errors in the expected audio responses provided by the user.

2. Apparatus according to claim 1 and wherein said user feedback interface also provides instruction to the user how to overcome the pronunciation errors.

3. Apparatus according to claim 1 and wherein said user feedback interface indicates to the user each pronunciation error immediately following each expected audio response.

4. Apparatus according to claim 1 and wherein said feedback interface provides audio and visual indications of said pronunciation errors.

5. Apparatus according to claim 1 and wherein said trigger generator comprises an audio specimen generator for playing audio specimens to a user.

6. Apparatus according to claim 5 and wherein said audio specimen generator is operative such that the expected audio response is a repetition of said audio specimen.

7. Apparatus according to claim 5 and wherein said audio specimen generator is operative such that the expected audio response is other than a repetition of said audio specimen.

8. Apparatus according to claim 5 and wherein said audio specimen generator is operative such that the expected audio response is an audio specimen which may be chosen from among more than one possible expected audio responses.

9. Apparatus according to claim 1 and wherein said trigger generator comprises an visual trigger generator for providing a visual trigger output to a user.

10. Apparatus according to claim 1 and wherein said expected audio response library comprises an expected audio response reference database.

11. Apparatus according to claim 10 and wherein said expected audio response reference database comprises a multiplicity of templates.

12. Apparatus according to claim 10 and wherein said expected audio response reference database is speaker independent.

13. A method for interactive language training comprising:

eliciting expected audio responses by a user;

providing an expected audio response reference library containing a multiplicity of reference expected responses, the multiplicity of reference expected responses including a first plurality of reference expected responses having acceptable pronunciation and for each of said first plurality of reference expected responses having acceptable pronunciation, a second plurality of reference expected responses each having different pronunciation errors;

indicating the relationship between the expected audio response provided by the user and the reference expected responses; and indicating to the user the pronunciation errors in the expected audio responses provided by the user.

14. A method according to claim 13 and also comprising providing instruction to the user how to overcome the pronunciation errors.

15. A method according to claim 13 and also comprising indicating to the user each pronunciation error immediately following each expected audio response.

16. A method according to claim 13 and also comprising providing audio and visual indications of said pronunciation errors to said user.

17. A method according to claim 13 and wherein said step of eliciting audio responses includes playing audio specimens to a user.

18. A method according to claim 17 and wherein said expected audio response is a repetition of said audio specimen.

19. A method according to claim 17 and wherein said expected audio response is other than a repetition of said audio specimen.

20. A method according to claim 17 and wherein said expected audio response is an audio specimen which may be chosen from among more than one possible expected audio responses.

21. A method according to claim 13 and wherein said step of eliciting comprises providing a visual trigger output to a user.

* * * * *